(12) United States Patent
Liu et al.

(10) Patent No.: US 12,293,010 B1
(45) Date of Patent: May 6, 2025

(54) CONTEXT-SENSITIVE PORTABLE MESSAGING BASED ON ARTIFICIAL INTELLIGENCE

(71) Applicant: AYL Tech, Inc., Kirkland, WA (US)

(72) Inventors: Jun Liu, Sammamish, WA (US); Meina Qu, Bellevue, WA (US); Jonathan E. Olson, Renton, WA (US)

(73) Assignee: AYL Tech, Inc.

( * ) Notice: Subject to any disclaimer, the term of this patent is extended or adjusted under 35 U.S.C. 154(b) by 0 days.

(21) Appl. No.: 18/766,473

(22) Filed: Jul. 8, 2024

(51) Int. Cl.
*G06F 3/01* (2006.01)
*G06V 40/20* (2022.01)

(52) U.S. Cl.
CPC ............... *G06F 3/01* (2013.01); *G06V 40/20* (2022.01)

(58) Field of Classification Search
CPC .................................. G06F 3/01; G06V 40/20
See application file for complete search history.

(56) References Cited

U.S. PATENT DOCUMENTS

| | | | |
|---|---|---|---|
| 10,970,831 B2 | 4/2021 | Putman et al. | |
| 11,042,729 B2 * | 6/2021 | Sud | G06F 3/011 |
| 11,157,525 B2 | 10/2021 | Wilshinsky | |
| 11,436,384 B2 | 9/2022 | Lafreniere et al. | |
| 11,464,491 B2 | 10/2022 | Jacob et al. | |
| 11,526,811 B1 | 12/2022 | Wu et al. | |
| 11,570,214 B2 | 1/2023 | Crabtree et al. | |
| 11,615,648 B2 | 3/2023 | Lee et al. | |
| 11,625,576 B2 | 4/2023 | Wu et al. | |
| 11,651,525 B2 | 5/2023 | Moore et al. | |
| 11,687,848 B2 | 6/2023 | Zayats et al. | |
| 11,705,112 B2 | 7/2023 | Olabiyi et al. | |
| 11,720,617 B2 | 8/2023 | Pirovano et al. | |
| 11,869,129 B2 | 1/2024 | Choi et al. | |
| 11,874,899 B2 | 1/2024 | Gudimetla et al. | |
| 11,875,130 B1 | 1/2024 | Bosnjakovic et al. | |
| 11,893,220 B1 | 2/2024 | Silverstein et al. | |
| 11,910,120 B2 | 2/2024 | Pandey et al. | |
| 11,972,052 B2 | 4/2024 | Lu et al. | |
| 12,008,591 B2 | 6/2024 | Baird | |
| 2014/0274078 A1 | 9/2014 | Hyde et al. | |
| 2015/0094046 A1 | 4/2015 | Jung et al. | |
| 2019/0325633 A1 * | 10/2019 | Miller, IV | G06V 40/18 |
| 2021/0232577 A1 * | 7/2021 | Ogawa | G06V 40/174 |
| 2022/0067353 A1 * | 3/2022 | Matteucci | G06V 20/49 |
| 2024/0078732 A1 * | 3/2024 | Beith | G06V 20/41 |
| 2024/0221260 A1 * | 7/2024 | Dinev | G06T 13/205 |

* cited by examiner

*Primary Examiner* — Muhammad N Edun
(74) *Attorney, Agent, or Firm* — AEON Law, PLLC; Adam L. K. Philipp; Jonathan E. Olson

(57) ABSTRACT

Systems, methods, and computer program products are disclosed in regard to causing a first artificial-intelligence-based expression to be presented via a portable unit based on a user-provided component or a current presentation context (or both). In some variants the presentation is tailored to a delivery zone of the expression or to behavior or other attributes of an intended target.

18 Claims, 7 Drawing Sheets

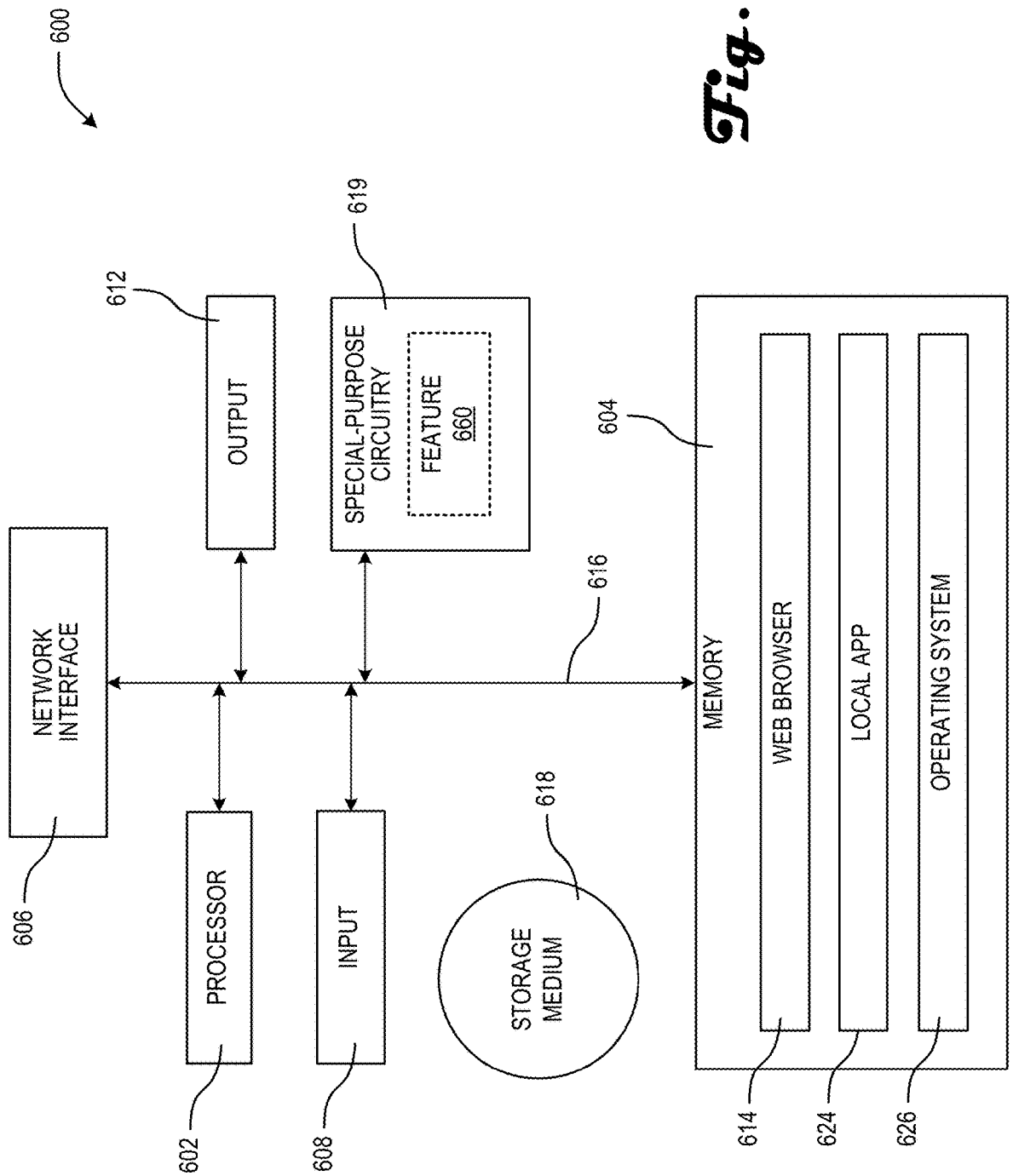

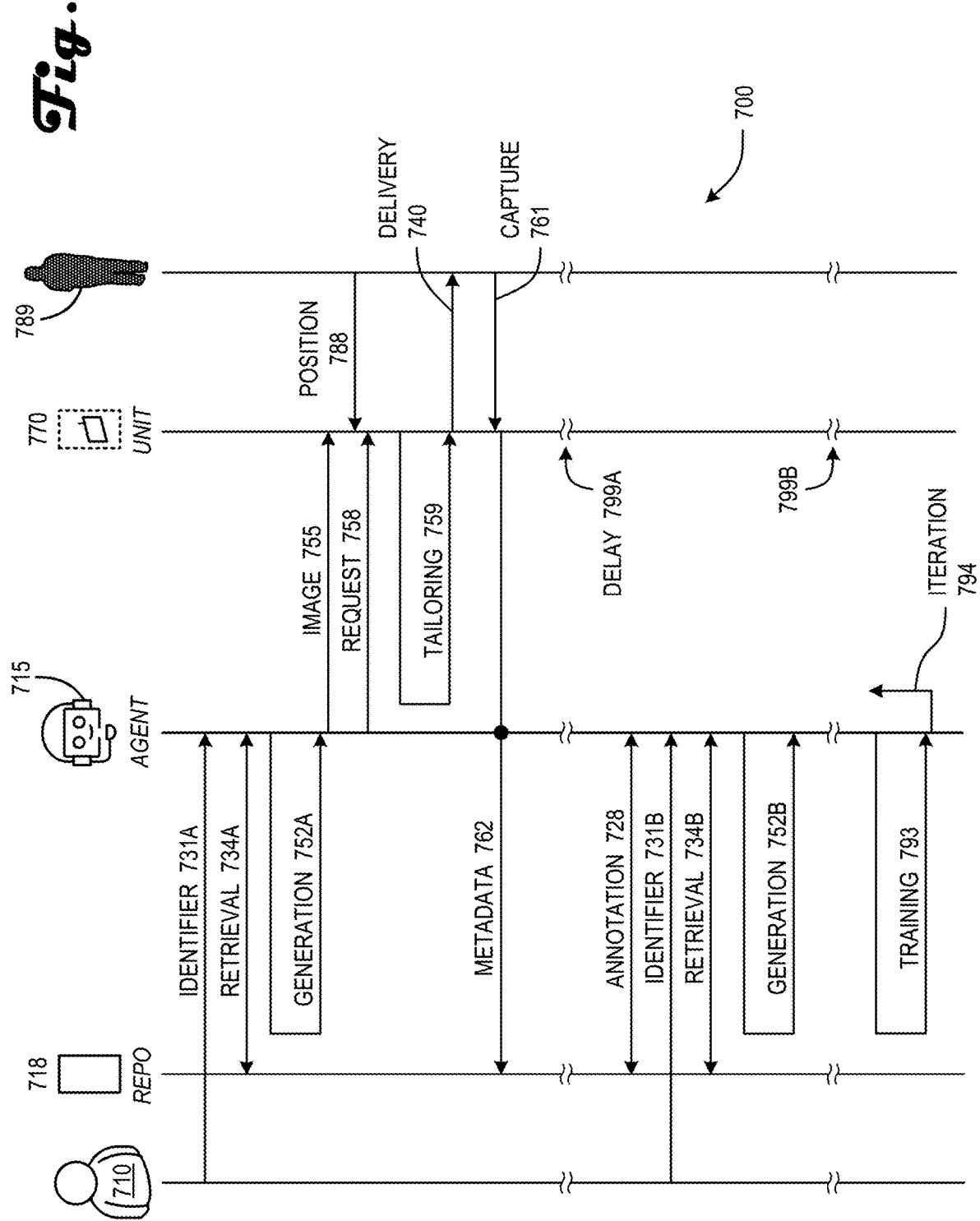

CONTEXT-SENSITIVE PORTABLE MESSAGING BASED ON ARTIFICIAL INTELLIGENCE

BRIEF DESCRIPTION OF THE DRAWINGS

FIG. 6 schematically depicts a client device in which one or more improved technologies may be incorporated.

FIG. 7 depicts a data flow and detailed scenario in which one or more improved technologies may be incorporated.

DETAILED DESCRIPTION

Figure 1:
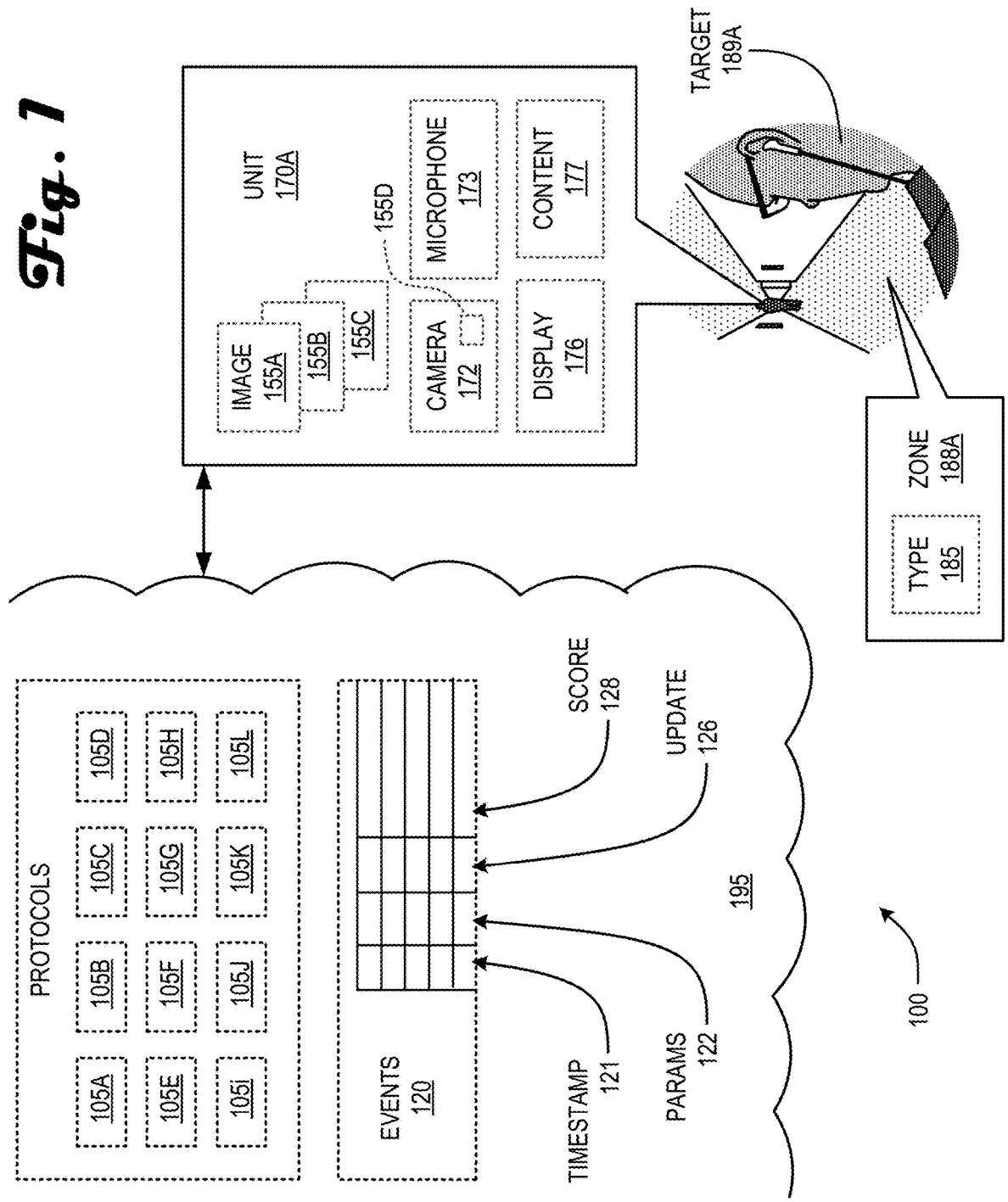
FIG. 1 schematically depicts a system in which a portable unit interacts with one or more networks so as to facilitate improved AI-based images being delivered via the portable unit in which one or more improved technologies may be incorporated.

The detailed description that follows is represented largely in terms of processes and symbolic representations of operations by conventional computer components, including a processor, memory storage devices for the processor, connected display devices, and input devices. Furthermore, some of these processes and operations may utilize conventional computer components in a heterogeneous distributed computing environment, including remote file servers, computer servers, and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Above," "after," "among," "any," "apparent," "application-specific," "archived," "associated," "at least," "authorized," "automatic," "available," "based on," "causing," "comprising," "configured," "connected," "coordinated," "corresponding," "crowdsourced," "digitally," "directly," "displayed," "distilled," "downloaded," "effective," "emotional," "enabled," "established," "event-sequencing," "exceeding," "executable," "explicitly," "facial," "favored," "first," "for," "from," "generated," "greater," "human," "identified," "immediate," "implemented," "included," "indicating," "inversely," "invoked," "light-emitting," "liquid," "local," "modified," "more," "obtained," "occupied," "of," "otherwise," "particular," "partly," "pertaining," "physical," "portable," "preferred," "presented," "primary," "prior," "proximately," "qualified," "quantified," "recognizable," "remote," "respective," "responsive," "sampled," "second," "signaling," "single," "so as," "special-purpose," "specific," "speculative," "suitable," "thereafter," "third," "toward," "transistor-based," "triggered," "undue," "updated," "valid," "via," "vicinity," "voluntary," "wherein," "without," or other such descriptors herein are used in their normal yes-or-no sense, not merely as terms of degree, unless context dictates otherwise. In light of the present disclosure, those skilled in the art will understand from context what is meant by "remote" and by other such positional descriptors used herein. Likewise, they will understand what is meant by "partly based" or other such descriptions of dependent computational variables/signals. "Immediate" as used herein refers to having a duration or delay of less than 2 seconds unless context dictates otherwise. Circuitry is "invoked" as used herein if it is called on to undergo voltage state transitions so that digital signals are transmitted therefrom or therethrough unless context dictates otherwise. Software is "invoked" as used herein if it is executed/triggered unless context dictates otherwise. One number is "on the order" of another if they differ by less than an order of magnitude (i.e., by less than a factor of ten) unless context dictates otherwise. As used herein "causing" is not limited to a proximate cause but also enabling, conjoining, or other actual causes of an event or phenomenon. As used herein "instances" of an item may or may not be identical or similar to each other. As used herein a "repository" may include a collection or description of AI-generated images or other content presented to one or more suitable targets or metadata pertaining to such a presentation. As used herein a cause and its effect are "contemporaneous" if they are separated by less than 2 hours. Also two events are "contemporaneous" if they are separated by less than 15 minutes.

Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Referring now to FIG. 1, there is shown a system 100 in which a wearable or other portable unit 170A interacts with one or more networks 195. This allows one or more machine learning protocols 105A or other protocols 105B-L to facilitate an improved assortment of avatars or other images 155A-C being delivered to one or more messaging targets 189A via (at least) a first visual display 176 according to a zone 188A in which one or more such targets 189 are situated. In some contexts, for example, one or more sensors (e.g. cameras 172, accelerometers, or microphones 173) obtain images 155D or other sensor input from which a "hallway," "office," "freeway," "night club," "cafeteria," "hospital", "interior," or other such zone type 185 can be gleaned with reference to a map, proximity, or other zone type definition. This can occur, for example, in a context in which user inputs, presentations of content 177, transitions between zones 188, identification of targets 189, correlated time intervals, and other such events 120 are logged and in which respective timestamps 121, operating parameters 122, updates 126, messaging locations, authorizations, effectiveness scores 128, and other such metadata are sampled or otherwise distilled for archiving and further development. As used herein a presentation of content is "messaging" if it is immediately perceptible to one or more human senses, whether or not it is verbal or explicit.

Figure 2:
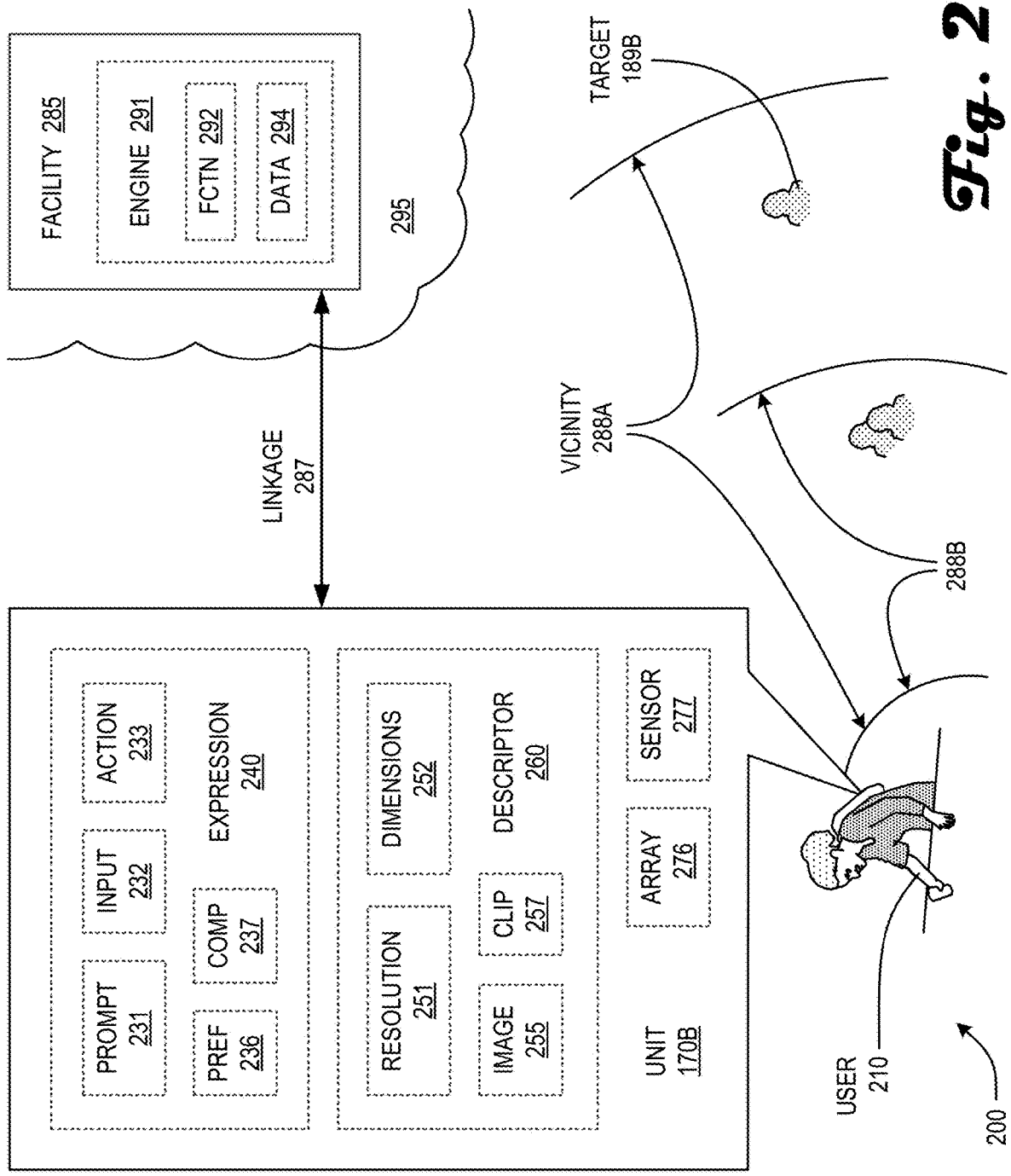
FIG. 2 schematically depicts a wearable portable unit interacting with one or more networks so as to facilitate improved AI-based images being delivered in which one or more improved technologies may be incorporated.

Referring now to FIG. 2, there is shown a system 200 in which a wearable unit 170B interacts with one or more remote facilities 285 in or via one or more networks 195, 295. "Remote" as used herein refers to items more than 10 kilometers from a powered display 176 of a portable unit content delivery unit 170 as described herein. In the interest of concision system 200 refers freely to items shown in FIG. 1 that may also be featured in system 200 without showing each item twice. Likewise system 100 refers freely to items shown in FIG. 2 that may also be featured in system 100 without showing each item twice. Wearable item 170B may likewise be an instance of portable item 170A or they may be both be used for aggregating effectiveness evaluation and training data 294 as further described below.

In some contexts, for example, data 294 from a camera 172 or other sensor 277 aboard a wearable unit 170A-B is frequently uploaded as a photographic, auditory, or other distillation that characterizes one or more vicinities 288A-B or messaging targets 189A-B that are currently available relative to or for another portable unit or its user 210. In some contexts, for example, a target 189B of particular interest may not be in a close enough vicinity 288B to a nearby unit 170A-B to convey legible words in a font size shorter than 2.6 centimeters or may not have apparently noticed a too-small or too-faint AI-rendered image 255. This can be distilled, for example, via a pattern recognition protocol 105B determining from a series of captured images 155D that a gaze of the target 189B did not remain on the AI-rendered image 255 long enough to signal interest or notice.

Such a remote facility 285 may house an artificial intelligence engine 291 that implements a machine learning protocol 105A using one or more scoring functions 292 or that manifests and annotates training data 294 as further described below. Such a unit 170B may handle one or more instances of message generation prompts 231; selections, validations, or other such user inputs 232; gestures or other suggestive actions 233; explicit or other preferences 236; or other such determinants or components 237 of messaging expressions 240. Such a unit 170B may likewise indicate one or more instances of resolutions 251 or dimensions 252 pertaining to a display 176 or rendered image 155A-C or clip 257; of captured photographic images 155D depicting targeted zones 188; or of message-correlated data 294 potentially indicative of AI-rendered images 255 having an effect on one or more targets 189.

Referring again to FIGS. 1-2, an exemplary method for artificial-intelligence-based (AI-based) messaging via a first portable unit 170A-C is disclosed. The exemplary method includes remotely requesting or otherwise causing an AI-based first expression 240 to be obtained based on a first message component 237 obtained from a "first" entity (e.g. a prompt 231 from a human user 210) and to be presented to one or more human "targets" 189A-B comprising a "second" entity (e.g. an incidental human recipient or other target 189).

Figure 3:
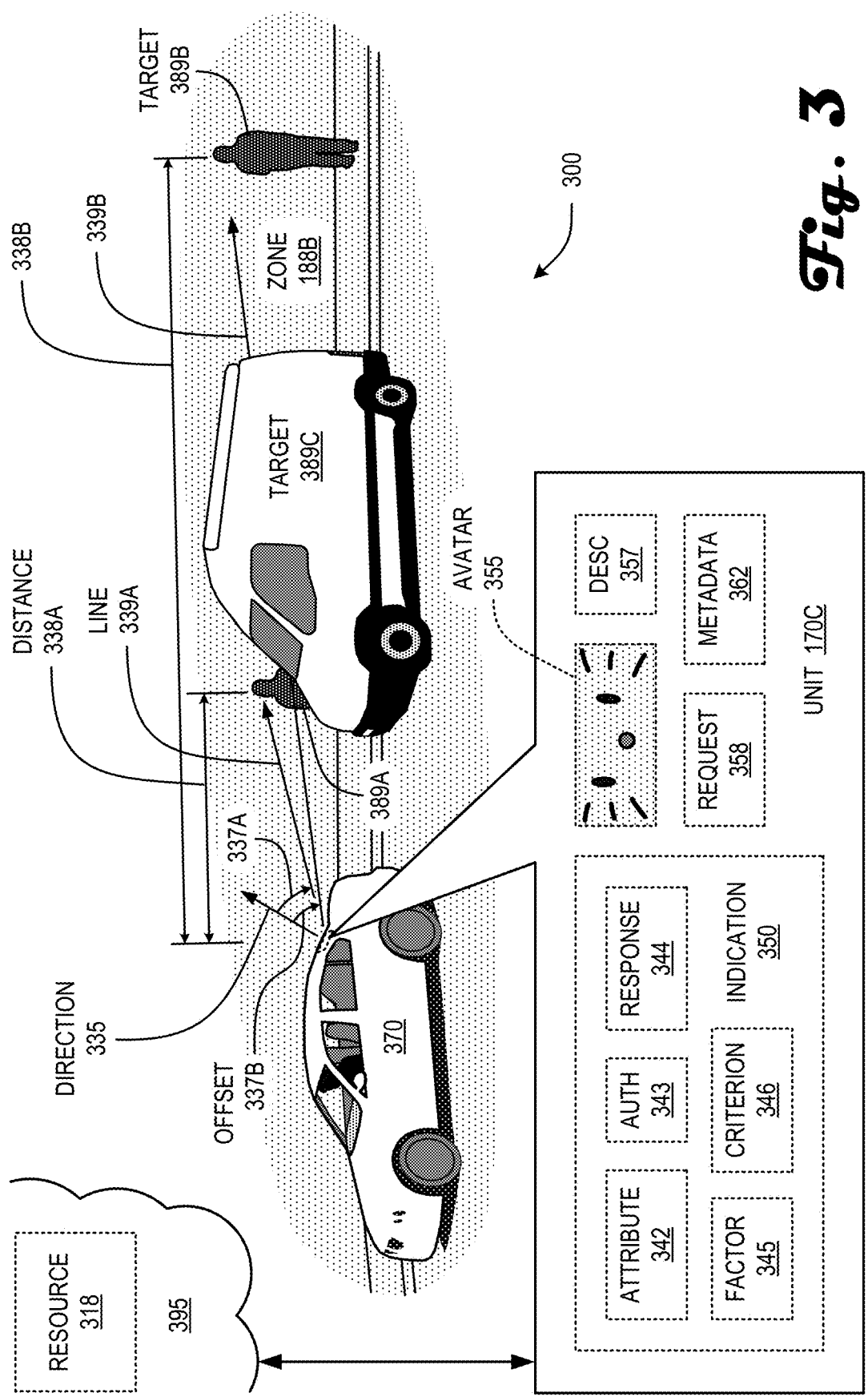
FIG. 3 schematically depicts a motor-vehicle-borne portable unit interacting with one or more networks so as to facilitate improved AI-based images being delivered in which one or more improved technologies may be incorporated.

Referring now to FIG. 3, there is shown a system 300 in which a portable unit 170C aboard a motor vehicle 370 interacts with one or more remote facilities 285 or interface users (or both) in or via one or more networks 195, 295, 395 described herein. In some contexts, for example, such a unit 170 may include a coarse element array 276 or other powered display 176 configured to allow specific message content 177 (e.g. one or more of an animation, avatar 355, request 358, or a sequence of these) to be generated or otherwise based on one or more artificial intelligence engines 291 and thereafter presented to one or more messaging targets 389A-C who are in a first zone 188 that is suitable for messaging that specific content 177 via the powered display 176. This can occur, for example, in a context in which the AI-based first expression 240 (e.g. an avatar 355, request 358, decoration, animation, or visible image sequence) is selected or generated based on one or more limiting physical features 660 of a display element array 276 aboard the first portable unit 170 or in which an indication 350 exists that a particular qualified target 189, 389 is expected in or otherwise associated with the first zone 188 (or both). In some variants, for example, one or more AI-based images 155 of the first expression 240 may be obtained based on a display element resolution 251, a feasible image size, a maximum aspect ratio 461 or frame rate, or other physical display features 660, indications of a viewing offset 337A-B, distance 338A-B to a primary target 389A-B, or other such criteria 346 taken into account by a generation or update protocol 105G-H described herein. See FIG. 4.

In some variants one or more images 155 of the first expression 240 are selected (e.g. using a selection protocol 105C based one or more galleries, social media content 177, rankings, inferred requester preferences 236, scores or other related metadata 362, keyword annotations, or other resources 318 described herein) based on one or more physical features 660 of an actual or ideal aspect ratio 461 or based on one or more indications of a range or other apparent distance 338A-B from the first portable unit 170 to a human messaging target 389A-B who belongs to the second entity (or both). Moreover in some variants one or more AI-based images 155 of the first expression 240 are obtained partly based on one or more indications 350 of a viewing offset 337A-B or based on one or more indications 350 of a target description 357 (e.g. signaling a vehicle or pedestrian of the second entity). Also in some variants the exemplary method may cause the AI-based first expression 240 to have characters or other shape components 237 that are large enough, vivid enough, and otherwise suited to and presented on a coarse array 276 (i.e. one having within an order of magnitude of 500 to 50000 elements) aboard the first portable unit 170A-C.

This can occur, for example, in a context in which a timing protocol 105i includes uploading same-day raw or other sensor data 294 including one or more photographic, global positioning system (GPS) location, vicinity type 185, illumination, estimated occupancy, or other characterization of one or more targetable vicinities (e.g. a neighborhood or other zone 188B) occupied by one or more qualified messaging targets 189, 389. Alternatively or additionally, such targets may be (presumed or otherwise) deemed messageable via the first portable unit 170 and timestamps or other metadata 362 describing such factors 345 may likewise be uploaded with the same-day sensor data 294 to which they pertain.

In some contexts, for example, a scoring protocol 105D may quantify a same-day messaging context quality score 128 based on one or more recognizable attributes 342 of a message-able zone 188 or target 389A-C; on one or more user-defined message authorizations 343; on one or more inferred distortions indicated by an angular offset 337B between an ideal transmission direction 335 and a sight line 339B to a particular target 339B; on one or more rough distances 338A-B between (some or all of) the first portable unit 170 and the corresponding particular target 339A-B; on one or more facial expressions or other human responses 344 apparently coinciding with the current content delivery; or on an arithmetic combination of such criteria 346. Such same-day scores 128 may, moreover, inform a contemporaneous next iteration of the delivery (e.g. to the same second entity or to a same or adjacent vicinity 288) so as to enrich learning data 294 that complies with one or more rules 462 specified in an authorization 343 from the first entity. See FIG. 7.

The exemplary method also includes remotely or otherwise invoking transistor-based circuitry (e.g. by an interface or control module 431-432) configured to cause a capture of an immediate or other first human response 344 from a second entity (e.g. one or more intended targets 189 or incidental recipients) in the first vicinity 288 of the first portable unit 170A-C via one or more cameras 172 or other sensors 277 of the first portable unit 170A-C coordinated with a first content delivery to the first vicinity 288 via the first portable unit 170A-C so as to capture a first digital image 155D via the first portable unit 170A-C soon enough after the AI-based first expression 240 is (initially or otherwise) presented whereby the first digital image 155D indicates a human response 344 to the AI-based first expression 240.

As used herein an invocation is "remote" if the code, circuitry, or other thing invoked is more than 10 kilometers (km) from the invocation of the invocation or event. Likewise an effect and one or more of its causes are "remote" from each other if they are more than 10 km apart. One or more physical objects or people are likewise "remote" if they are more than 10 km from a "portable unit" as described herein, unless context dictates otherwise.

Figure 4:
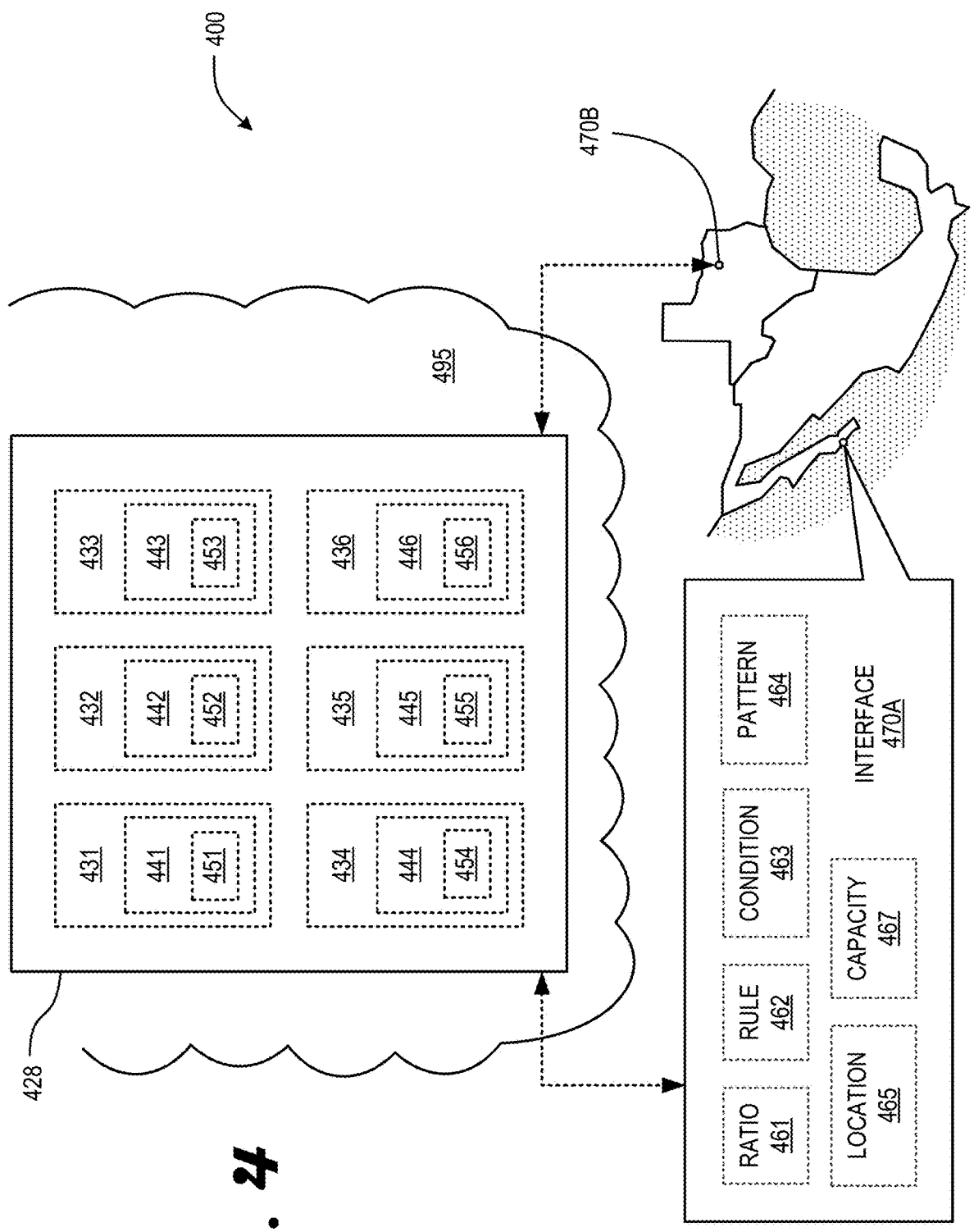
FIG. 4 schematically depicts a system featuring a cross-border or other remote implementation of interfaces suitable for use with a system like those of FIGS. 1-3 in which one or more improved technologies may be incorporated.

With reference to the system 400 of FIG. 4, interfaces 470A-B are respectively shown in Mexico and Texas. Each of these may handle one or more instances of users 210, of ratios 461, of digitally expressed rules 462, of conditions 463, of patterns 464, of GPS or other defined locations 465, or of capacities 467. In some variants one or more methods described herein may be performed (in respective embodiments) to control a message display of one of these interfaces 470A-B via the other.

In the interest of concision and according to standard usage in information management technologies, the functional attributes of modules described herein are set forth in natural language expressions. It will be understood by those skilled in the art that such expressions (functions or acts recited in English, e.g.) adequately describe structures identified below so that no undue experimentation will be required for their implementation. For example, any messaging or other informational data identified herein may be represented digitally as a voltage configuration on one or more electrical nodes (conductive pads of an integrated circuit, e.g.) of an event-sequencing structure without any undue experimentation. Each electrical node is highly conductive, having a corresponding nominal voltage level that is spatially uniform generally throughout the node (within a device or local system as described herein, e.g.) at relevant times (at clock transitions, e.g.). Such nodes (lines on an integrated circuit or circuit board, e.g.) may each comprise a forked or other signal path adjacent one or more transistors. Moreover, many Boolean values (yes-or-no decisions, e.g.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Such circuitry 428 may comprise one or more integrated circuits (ICs), for example, optionally mounted on one or more circuit boards that implementing an event-sequencing structure as generally described in U.S. Pub. No. 20150094046 but configured as described herein. Transistor-based circuitry 428 may (optionally) include one or more instances of interface modules 431 configured to set up and enable cloud or peripheral processing, for example, (each) including an electrical node set 441 upon which informational data 294 herein is represented as a corresponding voltage configuration 451. Transistor-based circuitry 428 may likewise include one or more instances of control modules 432 configured for local or cloud processing, for example, including an electrical node set 442 upon which informational data 294 is represented digitally as a corresponding voltage configuration 452. Transistor-based circuitry 428 may likewise include one or more instances of invocation modules 433 configured for local or cloud processing, for example, including an electrical node set 443 upon which informational data 294 is represented digitally as a corresponding voltage configuration 453. Transistor-based circuitry 428 may (optionally) likewise include one or more instances of (annotation or other) distillation modules 434 configured for triggering remote processing (using cloud-based instances of circuitry described herein, for example), including an electrical node set 444 upon which informational data 294 is represented digitally as a corresponding voltage configuration 454. Transistor-based circuitry 428 may likewise include one or more instances of response modules 435 configured for local or cloud processing, for example, including an electrical node set 445 upon which informational data 294 is represented digitally as a corresponding voltage configuration 455. Transistor-based circuitry 428 may likewise include one or more instances of (archiving or other) retention modules 436 configured for local or cloud processing, for example, including an electrical node set 446 upon which informational data 294 is represented digitally as a corresponding voltage configuration 456. In some variants, for example, a controller or other interface 470A in Mexico may manifest an instance of a signal path between an originating environment, an AI-based image adaptation or other processing environment, and a messaging destination interface 470B (e.g. where a motor vehicle 370 or other portable unit 170A-C presents AI-based images as described herein) in Texas.

Referring again to FIGS. 1-4, another exemplary method for artificial-intelligence-based (AI-based) messaging via a first portable unit 170A-C is disclosed. The exemplary method includes manually or otherwise invoking transistor-based circuitry (e.g. a first invocation module 433) configured to cause an AI-based first expression 240 to be formed (at least partly) based on a first message component 237) obtained from a first entity (e.g. a gig worker, unit operator, or other user 210. In some contexts the AI-based first expression 240 may also be based on a type 185 or other attribute 343 of a first (line 339A-B of sight or other effectively) accessible vicinity 288 of the first portable unit 170A-C.

This method may also include remotely or otherwise invoking transistor-based circuitry (e.g. a first instance of a control module 432) configured to cause a capture of a first human response 344 from a second entity (e.g. one or more intended targets 189 or incidental recipients) in the first (targetable zone 188 or other) vicinity 288 of the first portable unit 170A-C via one or more cameras 172 or other sensors 277 of the first portable unit 170A-C coordinated with a first content delivery to the first vicinity 288 via the first portable unit 170A-C so as to capture a first digital image 155D via the first portable unit 170A-C after the AI-based first expression 240 is (initially or otherwise) presented whereby the first digital image 155D indicates a first human response 344 to the AI-based first expression 240.

This method may also include invoking transistor-based circuitry (e.g. a user 210 remotely or otherwise invoking response and retention modules 435, 436 that are jointly) configured to trigger uploads or otherwise establish a durable record (e.g. in a repository or other archive) indicative of the first human response 344 from the second entity via the first portable unit 170A-C corresponding to the first content delivery via the first portable unit 170A-C. This can occur, for example, in a context in which human users 210, servers 500, and other agents each cause an invocation of an instance of such circuitry and in which disparate trickles of noisy metadata 362 pertaining to such human responses 344 (e.g. from nearby security cameras coincidentally oriented close enough to show each target's eye position) would otherwise take years to become suitable as image generation machine learning training data 294. See FIGS. 5-7.

Figure 5:
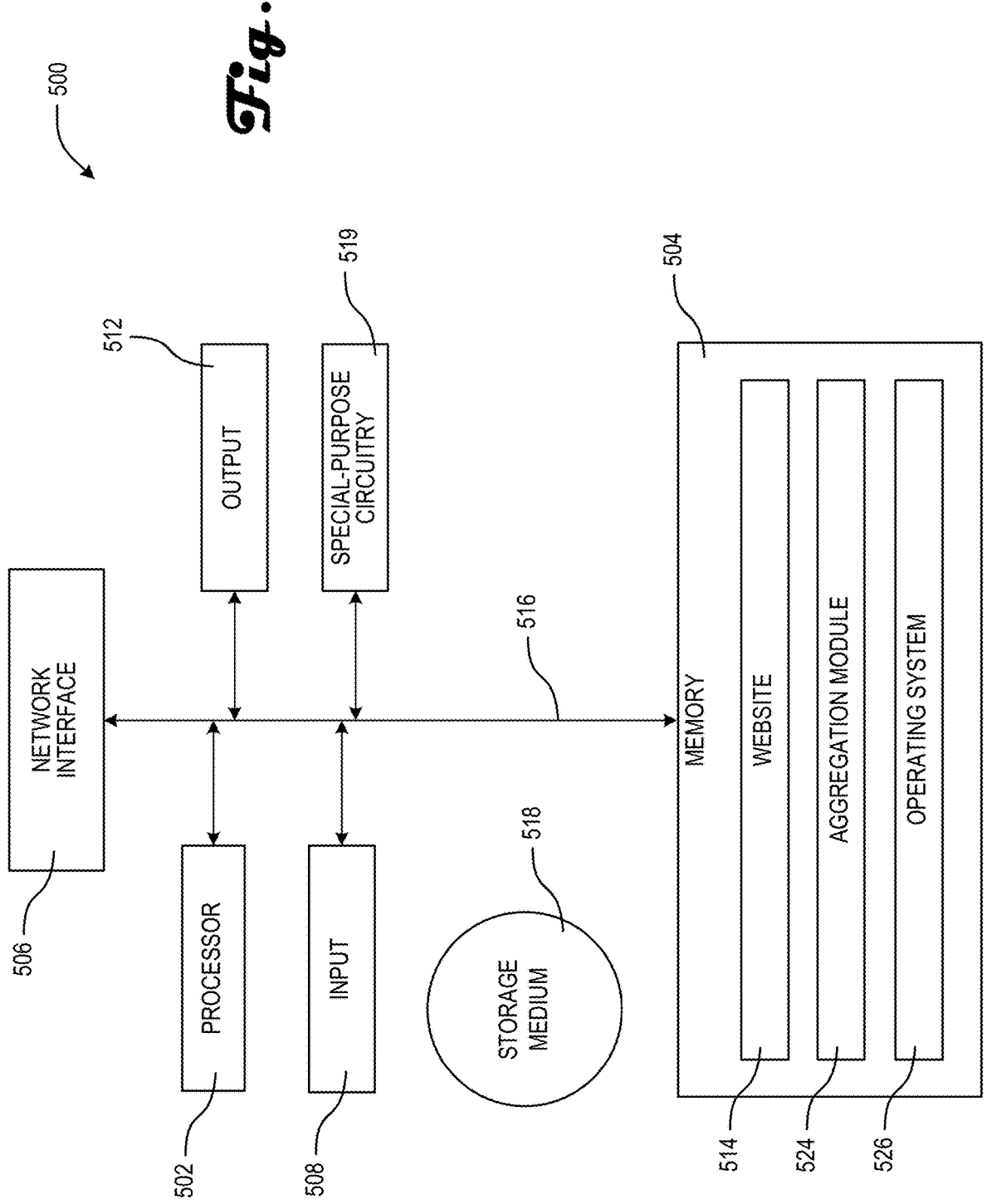
FIG. 5 schematically depicts a server in which one or more improved technologies may be incorporated.

Referring now to FIG. 5, there is shown a server 500 in which one or more technologies may be implemented. Server 500 may include one or more instances of processors 502, of memories 504, user inputs 508, and of presentation hardware 512 all interconnected along with the network interface 506 via a bus 516. One or more network interfaces 506 allow server 500 to connect via the Internet or other networks 195, 295, 395, 495. Memory 504 generally comprises a random access memory ("RAM"), a read only memory ("ROM"), and a permanent mass storage device, such as a disk drive.

Memory 504 may contain one or more instances of websites 514, of aggregation modules 524, of operating systems 526, or of scoring protocols 105D that facilitate modeling of and improving compliance with one or more (speculative latent or other) preferences 236 of a message-triggering "first entity." See FIG. 7. These and other software components may be loaded from a non-transitory computer readable storage medium 518 into memory 504 of the server 500 using a drive mechanism (not shown) associated with a non-transitory computer readable storage medium 518, such as a floppy disc, tape, DVD/CD-ROM drive, flash card, memory card, or the like. In some embodiments, software or other digital components may be loaded via the network interface 506, rather than via a computer readable storage medium 518. Special-purpose circuitry 519 may, in some variants, include some or all of the event-sequencing logic described herein. In some embodiments server 500 may include many more components than those shown in FIG. 5, but it is not necessary that all conventional components of a server be shown in order to disclose an illustrative embodiment.

Referring now to FIG. 6, there is shown a client device 600 in which one or more technologies may be implemented. Client device 600 may include one or more instances of processors 602, of memories 604, user inputs 608, and of presentation hardware 612 all interconnected along with the network interface 606 via a bus 616. This can occur, for example, in a context in which the client device 600 comprises a passenger vehicle 370 or other portable unit 170A-C configured to use a coarse element array 276 as described herein. One or more network interfaces 606 allow such a device 600 to connect via the Internet or other networks 195. Memory 604 generally comprises a random-access memory ("RAM"), a read only memory ("ROM"), and a permanent mass storage device, such as a disk drive.

Memory 604 may contain one or more instances of web browsers 614, of other local apps 624, of operating systems 626, or of other modules that facilitate operations described herein. These and other software components may be loaded from a non-transitory computer readable storage medium 618 into memory 604 of the client device 600 using a drive mechanism (not shown) associated with a non-transitory computer readable storage medium 618, such as a floppy disc, tape, DVD/CD-ROM drive, flash card, memory card, or the like. In some embodiments, software or other digital components may be loaded via the network interface 606, rather than via a computer readable storage medium 618. Special-purpose circuitry 622 (implementing a security feature 660, e.g.) may, in some variants, include some or all of the event-sequencing logic described herein. In some embodiments client device 600 may include many more components than those shown in FIG. 6, but it is not necessary that all conventional components of a mobile device be shown in order to disclose an illustrative embodiment.

Referring now to FIG. 7, there is shown a data flow 700 and detailed scenario in which one or more technologies may be implemented. As shown one or more prompts 231 or other identifiers 731A are received from one or more users 210 of a remote interface 470 or other client device 600 and used by an AI agent 715 to implement an interactive retrieval 734A of content elements (e.g. providing thematic or other appropriate expression) from a repository 718 or other resources 318 described herein that correspond to the one or more received identifiers 731A. In image generation 752A the AI agent 715 uses machine learning protocols to generate or optimize one or more avatars 355, printed phrases, or other images 155, 755 and one or more related presentation requests 358, 758 partly based on the one or more received identifiers 731A and partly based on the retrieval 734A.

This can occur, for example, in a context in which the first message component comprises a hint or suggestion (e.g. to turn right, to smile, or to connect with the first entity), in which an indication 350 of the second entity signals a photographic or other position 788 of one or more targets 189, 389, 789 of interest; and in which at least one such recipient seems based on a series of photographic images of the recipient to have taken the hint or suggestion. In a context in which a particular target 389, 789 is initially recognized at a bottom edge or similar nonideal position 788 in a photographic image, for example, an AI agent 715 may implicitly glean an angular offset 337 that would favorably modify one or more otherwise-suitable raw images 755 or other messages from a perspective of the particular target 389, 789. Such messages may undergo tailoring 759 that implements a compensatory image distortion (e.g. a vertical stretching that mitigates the angular offset 337) as a form of tailoring 759 affecting one or more component fonts or other graphic images 155, 355, 755 in the messaging delivery 740. Alternatively or additionally such tailoring 759 may include a real time or other line thickening; a selective image element brightness adjustment; a tilting of one or more components of the images 155, 355, 755 to better align with the perspective of the eyes of the particular target 389, 789 (e.g. so that lettering thereby becomes perceivable as upright); an image vibration or similar animation; or a combination of these.

In some variants a first capture 761 of a first human response 344 from the second entity comprises a video clip or other series of more than ten photographic images 155D that begin during the first content delivery 740 on the first display 176 and depict at least one target 789 of the second entity whose responsive action 233 affects a first merit score 128. This can occur, for example, in a context in which such scores 128 are later used as training data 294 in one or more parametric adjustment iterations 794; in which one or more image update protocols 105H are automatically implemented by which a series of visual or other message deliveries 740 become more effective over a course of more than a week; in which such human responses 344 capture a target recipient's eye movement and other facial expression via one or more sensors 277 of the first portable unit 170, 770 less than 5 minutes after the corresponding content delivery 740 is initiated; in which such metadata 762 is sufficiently potent that dozens of occurrences are sufficient to distill a parametric update 126 that achieves a higher-scoring message generation and delivery 740 as described herein; and in which reaching or exceeding that degree of score improvement without iterations 794 based on such metadata 762 would otherwise require thousands of message deliveries 740.

After a delay 799A of more than a minute, for example, one or more annotations 728 concerning the specific delivery 740 are used in contemporaneous and subsequent evaluations of content in repository 718. In this way, a subsequent same or similar identifier 731B can more effectively trigger a better retrieval 734B or generation 752B than those described above insofar that modified target, zone, or other attributes 343 thereof are thereby used as processing parameters 122 leading to and confirmed as achieving still better scores 128 through subsequent iterations 793 of training 794 as described herein.

In light of teachings herein, numerous existing techniques may be applied for configuring special-purpose circuitry or other structures effective for gleaning user preferences, quantifying and improving messaging effectiveness, characterizing human interaction and occupied zones, and other messaging-related issues as described herein without undue experimentation. See, e.g., U.S. Pat. No. 12,008,591 ("Machine learning based user targeting"); U.S. Pat. No. 11,972,052 ("Interactive human preference driven virtual texture generation and search, and haptic feedback systems and methods"); U.S. Pat. No. 11,910,120 ("Visual experience modulation based on stroboscopic effect"); U.S. Pat. No. 11,893,220 ("Generating and modifying graphical user interface elements"); U.S. Pat. No. 11,875,130 ("Confidence generation for managing a generative artificial intelligence model"); U.S. Pat. No. 11,874,899 ("Automated multimodal adaptation of multimedia content"); U.S. Pat. No. 11,869,129 ("Learning apparatus and method for creating image and apparatus and method for image creation"); U.S. Pat. No. 11,720,617 ("Method and system for automated generation and editing of educational and training materials"); U.S. Pat. No. 11,705,112 ("Adversarial, learning framework for persona-based dialogue modeling"); U.S. Pat. No. 11,687,848 ("Identifying correlated roles using a system driven by a neural network"); U.S. Pat. No. 11,651,525 ("Utilizing machine learning models for inserting user-generated content into media content"); U.S. Pat. No. 11,625,576 ("Systems and methods for image style transformation"); U.S. Pat. No. 11,615,648 ("Practice drill-related features using quantitative, biomechanical-based analysis"); U.S. Pat. No. 11,570,214 ("Crowdsourced innovation laboratory and process implementation system"); U.S. Pat. No. 11,526,811 ("Method for predicting trip purposes using unsupervised machine learning techniques"); U.S. Pat. No. 11,464,491 ("Shape-based generative adversarial network for segmentation in medical imaging"); U.S. Pat. No. 11,436,384 ("Computer-aided techniques for iteratively generating designs"); U.S. Pat. No. 11,157,525 ("Method and system for self-aggregation of personal data and control thereof"); U.S. Pat. No. 10,970,831 ("Systems, devices, and methods for providing feedback on and improving the accuracy of super-resolution imaging"); and U.S. Pub. No. 20140274078 ("Protocols for facilitating broader access in wireless communications").

Although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, first combinations of aspects and embodiments are articulated in a shorthand form such that (1) according to respective embodiments, for each instance in which a "component" or other such identifiers appear to be introduced (e.g., with "a" or "an,") more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES

Clause 1. A context-responsive method for artificial-intelligence-based (AI-based) messaging via a first portable unit 170, 770; the method comprising:

invoking transistor-based circuitry (e.g. a second invocation module 433) configured to cause an AI-based first expression 240 to be formed based on a first message component 237 obtained from a human cohort or other entity 710; and invoking transistor-based circuitry (e.g. one or more control modules 432) configured to cause a first content delivery 740 of the AI-based first expression 240 to a second entity (e.g. comprising one or more human targets 189, 389, 789) in a first sight line 339 or other vicinity 288 of said first portable unit 170, 770.

Clause 2. The method of Clause 1 wherein causing the first content delivery 740 comprises:
invoking transistor-based circuitry (e.g. another instance of a control module 432) configured to cause a first (instance of a) capture 761 of a first photographic or other human response 344 from the second entity in the first (identified zone 188, range, or other) vicinity 288 of the first portable unit 170, 770.

Clause 3. The method of any of the above Clauses wherein one or more images 155 of the first expression 240 are obtained partly based on one or more physical features 660 that include an aspect ratio 461 and partly based on one or more indications of an angular viewing offset 337A-B tending to distort a display 176 of the AI-based first expression 240 from a position of the second entity.

Clause 4. The method of any of the above Clauses wherein one or more images 155 of the first expression 240 are generated or otherwise obtained partly based on one or more indications of an angular viewing offset 337A-B tending to distort a display 176 of the AI-based first expression 240 from a position of the second entity and partly based on a first face size or other digital indications of a distance 338A-B to a target 389A-C (e.g. as all or part of the second entity).

Clause 5. The method of any of the above Clauses wherein one or more images 155 of the first expression 240 are retrieved or otherwise selectively obtained partly based on a direct or other indication of a range or other distance 338A-B to some or all of the second entity and partly based on one or more physical features 660 of an aspect ratio 461.

Clause 6. The method of any of the above Clauses wherein one or more images 155 of the first expression 240 are based on one or more shape-related or other latent indications 350 pertaining to a target 389A-C of the second entity that discernably correspond to a description 357 of a vehicle or moving target 389 (or both).

Clause 7. The method of any of the above Clauses wherein one or more images 155 of the first expression 240 are based on one or more latent or other indications 350 pertaining to a target 389A-C of the second entity that discernably correspond to a description 357 of a vehicle or moving target 389 (or both).

Clause 8. The method of any of the above Clauses wherein causing the first content delivery 740 comprises:
invoking transistor-based circuitry (e.g. another instance of a control module 432) configured to cause a first (instance of a) capture 761 of a first human response 344 from the second entity in the first (identified zone 188, range, frustum, or other) vicinity 288 of the first portable unit 170, 770 via a first display 176 aboard the first portable unit 170, 770 coordinated with a first content delivery 740 to the first vicinity 288 via the first portable unit 170, 770 that includes the AI-based first expression 240.

Clause 9. The method of any of the above Clauses comprising:
causing the AI-based first expression 240 to be formed partly based on a first message component 237 obtained from the first entity 710 and partly based on one or more limiting physical features of an element array 276, the element array comprising a first display 176 aboard the first portable unit 170, 770.

Clause 10. The method of any of the above Clauses comprising:
causing a first capture 761 of a first human response 344 from the second entity in the first vicinity 288 of the first portable unit 170, 770 less than one second after the AI-based first expression 240 is presented via the first portable unit 170, 770 whereby the first digital photograph (latently, speculatively, or otherwise) effectively indicates a first human response 344 of the second entity to the AI-based first expression 240.

Clause 11. The method of any of the above Clauses comprising:
causing a first capture 761 of a first human response 344 from the second entity in the first vicinity 288 of the first portable unit 170, 770 after the AI-based first expression 240 is presented via the first portable unit 170, 770 whereby the first digital photograph effectively indicates a particular (affirmative or other) human response 344 of the second entity to the AI-based first expression 240.

Clause 12. The method of any of the above Clauses wherein the first content delivery 740 includes presenting one or more images 155, 255, 755 on a first display 176 aboard the first portable unit 170, 770 while the first display 176 is moving (directly or otherwise) away from the second entity.

Clause 13. The method of any of the above Clauses wherein the second entity includes a moving target (e.g. as eventually ascertained from a series of crowdworker-evaluated photographs of the moving target) in the first vicinity 288.

Clause 14. The method of any of the above Clauses wherein the second entity includes a motor vehicle in the first vicinity 288.

Clause 15. The method of any of the above Clauses wherein the second entity includes one or more uniformed individuals in the first vicinity 288.

Clause 16. The method of any of the above Clauses wherein the second entity includes a pedestrian (e.g. as eventually determined by a crowdworker-evaluated photograph of the pedestrian) in the first vicinity 288.

Clause 17. The method of any of the above Clauses wherein a description 357 of (at least some of) the second entity is thereafter obtained (e.g. via one or more crowdsourcing protocols 105F or other recognition protocols 105B)

Clause 18. The method of any of the above Clauses wherein one or more descriptions 357 of the second entity are thereafter obtained by an annotation or aggregation protocol 105J-K (or both).

Clause 19. The method of any of the above Clauses wherein one or more descriptions 357 of the second entity are remotely or otherwise obtained by one or more aggregation or archiving protocols 105K-L.

Clause 20. The method of any of the above Clauses wherein the invoking transistor-based circuitry configured to cause a first capture 761 of a first human response 344 from the second entity is "automatically" coordinated with the first content delivery 740 to the first vicinity 288 insofar that the capture 761 of the first human response 344 and the first content delivery 740 are both triggered by a (user input or other) single common triggering event 120 at the first portable unit 170, 770.

Clause 21. The method of any of the above Clauses wherein the invoking transistor-based circuitry configured to cause a first capture 761 of a first human response 344 from the second entity is automatically coordinated with the first content delivery 740 to the first (targetable or other) vicinity 288.

Clause 22. The method of any of the above Clauses wherein the invoking transistor-based circuitry configured to cause a first capture 761 of a first human response 344 from the second entity is "automatically" coordinated with the first content delivery 740 to the first vicinity 288 insofar that the capture 761 of the first human response 344 and the first content delivery 740 are both triggered immediately by a single common event 120.

Clause 23. The method of any of the above Clauses wherein the invoking transistor-based circuitry configured to cause a first capture 761 of a first human response 344 from the second entity is "automatically" coordinated with the first content delivery 740 to the first vicinity 288 insofar that the capture 761 of the first human response 344 and the first content delivery 740 are both triggered by a common timing protocol 105*i*.

Clause 24. The method of any of the above Clauses comprising:
  automatically or otherwise invoking transistor-based circuitry (e.g. response and retention modules 435, 436 jointly) configured to establish a durable record indicative of the first human response 344 from the second entity via the first portable unit 170, 770 corresponding to the first content delivery 740 via the first portable unit 170, 770.

Clause 25. The method of any of the above Clauses comprising:
  remotely or otherwise annotating a durable record (explicitly or otherwise) indicative of the first human response 344 from the second entity via the first portable unit 170, 770 corresponding to the first content delivery 740 via the first portable unit 170, 770 more than one day and less than one year after a first capture 761 of a first human response 344 from the second entity in the first vicinity 288 of the first portable unit 170, 770 via a first display 176 aboard the first portable unit 170, 770.

Clause 26. The method of any of the above Clauses wherein the first content delivery 740 to the first vicinity 288 via the first portable unit 170, 770 included displaying one or more images 155, 255, 755 of the first content delivery 740 on a first display 176 aboard the first portable unit 170 to the second entity while the first display 176 is moving and wherein at least some of a first capture 761 of a first human response 344 from the second entity in the first vicinity 288 is obtained after a cessation of the first content delivery 740 at the first portable unit 170, 770.

Clause 27. The method of any of the above Clauses wherein the first content delivery 740 to the first vicinity 288 via the first portable unit 170, 770 included displaying one or more images 155, 255, 755 of the first content delivery 740 on a first display 176 aboard the first portable unit 170 to the second entity while the first display 176 was moving and wherein at least some of a first capture 761 of a first human response 344 from the second entity in the first vicinity 288 was obtained via a first camera 172 aboard the first portable unit 170, 770.

Clause 28. The method of any of the above Clauses wherein the first content delivery 740 to the first vicinity 288 via the first portable unit 170, 770 included displaying one or more images 155, 255, 755 of the first content delivery 740 on a first display 176 aboard the first portable unit 170 to the second entity and while the second entity was (sitting, standing, r otherwise) stationary and wherein at least some of a first capture 761 of a first human response 344 from the second entity in the first vicinity 288 was obtained via a first camera 172 aboard the first portable unit 170, 770.

Clause 29. The method of any of the above Clauses wherein the first content delivery 740 to the first vicinity 288 via the first portable unit 170, 770 included displaying one or more images 155, 255, 755 of the first content delivery 740 on a first display 176 aboard the first portable unit 170 to the second entity while the first display 176 was moving and while the second entity was stationary and wherein at least some of a first capture 761 of a first human response 344 from the second entity in the first vicinity 288 was obtained via a first camera 172 aboard the first portable unit 170, 770.

Clause 30. The method of any of the above Clauses wherein the first content delivery 740 included displaying one or more images 155, 255, 755 on a first display 176 aboard the first portable unit 170 while the first display 176 moves (directly or otherwise) away from the second entity.

Clause 31. The method of any of the above Clauses wherein the first content delivery 740 to the first vicinity 288 via the first portable unit 170, 770 included displaying one or more images 155, 255, 755 of the first content delivery 740 on a first display 176 aboard the first portable unit 170 to the second entity while the first display 176 was moving and wherein at least some of a first capture 761 of a first human response 344 from the second entity in the first vicinity 288 began during the first content delivery 740 on the first display 176.

Clause 32. The method of any of the above Clauses wherein the first content delivery 740 to the first vicinity 288 via the first portable unit 170, 770 includes displaying one or more images 155, 255, 755 of the first content delivery 740 on a first display 176 aboard the first portable unit 170 to the second entity while the first display 176 is moving away from the second entity and wherein at least some of a first capture 761 of a first human response 344 from the second entity in the first vicinity 288 began during the first content delivery 740 on the first display 176.

Clause 33. The method of any of the above Clauses wherein the first content delivery 740 to the first vicinity 288 via the first portable unit 170, 770 included displaying one or more images 155, 255, 755 of the first content delivery 740 on a first display 176 aboard the first portable unit 170 to the second entity and wherein at least some of a first capture 761 of a first human response 344 from the second entity in the first vicinity 288 included one or more photographs captured via one or more cameras 172 aboard the first portable unit 170, 770 more than 2 minutes after a cessation of the first content delivery 740 on a first display 176.

Clause 34. The method of any of the above Clauses wherein the first vicinity 288 of the first portable unit 170, 770 was a stationary zone 188 when one or more images 155, 255, 755 of the first content delivery 740 were displayed to the second entity.

Clause 35. The method of any of the above Clauses wherein the first vicinity 288 of the first portable unit 170, 770 was a stationary zone 188 that included an outdoor space when one or more images 155, 255, 755 of the first content delivery 740 were displayed to the second entity.

Clause 36. The method of any of the above Clauses wherein the first vicinity 288 of the first portable unit 170, 770 was a first zone 188 that included an indoor portion (at least) when one or more images 155, 255, 755 of the first content delivery 740 were displayed to the second entity.

Clause 37. The method of any of the above Clauses wherein the first vicinity 288 of the first portable unit 170, 770 is a stationary zone 188 and wherein the first content delivery 740 includes displaying one or more images 155, 255, 755 on a first display 176 aboard the first portable unit 170 to the second entity while the first display 176 is moving away from the stationary zone 188.

Clause 38. The method of any of the above Clauses wherein the first vicinity 288 of the first portable unit 170, 770 is a stationary zone 188 and wherein the first content delivery 740 includes displaying one or more images 155, 255, 755 on a first display 176 aboard the first portable unit 170 to the second entity while the first display 176 is moving (directly or otherwise) away from the stationary zone 188 and while the second entity remains in the stationary zone.

Clause 39. The method of any of the above Clauses wherein at least some of a first capture 761 of a first human response 344 from the second entity in the first vicinity 288 was performed (e.g. by a camera therein) entirely within the first portable unit 170, 770.

Clause 40. The method of any of the above Clauses wherein the first portable unit 170, 770 was (being carried or otherwise) traveling when a beginning of a first capture 761 of a first human response 344 from the second entity occurred.

Clause 41. The method of any of the above Clauses wherein the first portable unit 170, 770 was traveling when an ending of a first capture 761 of a first human response 344 from the second entity occurred.

Clause 42. The method of any of the above Clauses wherein the first portable unit 170, 770 was traveling during an entirety of a first capture 761 of a first human response 344 from the second entity.

Clause 43. The method of any of the above Clauses wherein the first portable unit 170, 770 was carried aboard a (bicycle, car, or other) passenger vehicle 370 when at least some of a first capture 761 of a first human response 344 from the second entity occurred.

Clause 44. The method of any of the above Clauses wherein the first portable unit 170, 770 was carried aboard a moving motor vehicle 370 when at least some of a first capture 761 of a first human response 344 from the second entity occurred.

Clause 45. The method of any of the above Clauses wherein the first portable unit 170, 770 comprised at least one of a motor vehicle 370 or a wearable article (e.g. a backpack or article of clothing) when at least some of a first capture 761 of a first human response 344 from the second entity occurred.

Clause 46. The method of any of the above Clauses wherein the first portable unit 170, 770 comprised at least one of a handheld client device 600 (e.g. a smartphone) or a wearable article when at least some of a first capture 761 of a first human response 344 from the second entity occurred.

Clause 47. The method of any of the above Clauses wherein the first portable unit 170, 770 comprises a wearable article.

Clause 48. The method of any of the above Clauses wherein causing a capture 761 of a first human response 344 from the second entity comprises photographing at least one person of the second entity whose responsive action 233 affects a first (inverse or other) merit score 128 that is used as training data 294 in one or more machine learning iterations 704.

Clause 49. The method of any of the above Clauses wherein causing a capture 761 of a first human response 344 from the second entity (is included and) comprises photographing at least one person of the second entity whose responsive action 233 affects a first (scalar or other) merit-indicative score 128 that is used as training data 294 in one or more parametric adjustment iterations 704 whereby one or more image generation protocols 105G are improved.

Clause 50. The method of any of the above Clauses wherein causing a capture 761 of a first human response 344 from the second entity comprises photographing at least one person of the second entity whose responsive action 233 affects a first merit-indicative score 128 that is used as training data 294 in one or more protocol selection iterations 704 whereby one or more image generation protocols 105G are improved.

Clause 51. The method of any of the above Clauses wherein causing a capture 761 of a first human response 344 from the second entity comprises photographing at least one person of the second entity whose responsive action 233 affects a first merit score 128 that is used as training data 294 in one or more parametric adjustment iterations 704 whereby one or more image selection protocols 105C are improved.

Clause 52. The method of any of the above Clauses wherein causing a capture 761 of a first human response 344 from the second entity (is included and) comprises photographing at least one person of the second entity whose responsive action 233 affects a first merit score 128 that is used as training data 294 in one or more parametric adjustment iterations 704 whereby one or more image update protocols 105H occur whereby a future delivery tailoring 759 becomes more effective.

Clause 53. The method of any of the above Clauses wherein causing a capture 761 of a first human response 344 from the second entity comprises photographing at least one person of the second entity whose responsive action 233 affects a first merit score 128 that is used as training data 294 in one or more parametric adjustment iterations 704 whereby one or more image update protocols 105H occur whereby a series of message deliveries 740 become more effective over time.

Clause 54. The method of any of the above Clauses wherein causing a capture 761 of a first human response 344 from the second entity (is included and) comprises photographing at least one person of the second entity whose responsive action 233 affects a first (inverse or other) merit score 128 that is used as training data 294 in one or more parametric adjustment iterations 704 whereby one or more image update protocols 105H occur whereby a series of message deliveries 740 each associated with a corresponding human response capture 761 manifests one or more improvements.

Clause 55. The method of any of the above Clauses wherein causing a capture 761 of a first human response 344 from the second entity comprises photographing at least one person of the second entity whose responsive action 233 affects a first merit score 128 that is used as training data 294 in one or more parametric adjustment iterations 704 whereby one or more image update protocols 105H occur whereby later image tailoring 759 (e.g. comprising a suitable display brightness adjustment responsive to delivery context) manifests one or more delivery improvement iterations 794.

Clause 56. The method of any of the above Clauses wherein causing a capture 761 of a first human response 344 from the second entity comprises photographing at least one person of the second entity whose responsive action 233 affects a first merit score 128 that is used as training data 294 in one or more parametric adjustment iterations 704 whereby one or more image update protocols 105H occur whereby image distortion mitigation tailoring 759 (e.g. comprising a "stretching" or "tilting" of at least one image 155 of a second content delivery 740 to reduce a detected pitch, roll, or other angular offset 337 between an ideal display orientation/direction 335 and an actual current delivery orientation or sight line 339 to at least one 389) manifests one or more delivery improvement iterations 794.

Clause 57. The method of any of the above Clauses wherein causing a capture 761 of a first human response 344 from the second entity (is included and) comprises photographing at least one person of the second entity whose responsive action 233 affects a first merit score 128 that is used as training data 294 in one or more parametric adjustment iterations 704 whereby one or more image update protocols 105H occur whereby future image tailoring 759 (e.g. comprising an energy usage adjustment responsive to delivery context) manifests one or more delivery improvements.

Clause 58. The method of any of the above Clauses wherein one or more annotations in the durable record indicative of the first human response 344 that affect a (speculative or other) messaging effectiveness score 128.

Clause 59. The method of any of the above Clauses wherein causing a capture 761 of a first human response 344 from the second entity comprises photographing at least one incidental message recipient of the second entity (e.g. target 389A-B).

Clause 60. The method of any of the above Clauses wherein causing a capture 761 of a first human response 344 from the second entity comprises photographing at least one targeted message recipient of the second entity.

Clause 61. The method of any of the above Clauses wherein causing a capture 761 of a first human response 344 from the second entity comprises photographing at least one person of the second entity whose identity is discernable (e.g. by name or other unique identifier) in the durable record indicative of the first human response 344 from the second entity.

Clause 62. The method of any of the above Clauses wherein causing a capture 761 of a first human response 344 from the second entity comprises photographing at least one person of the second entity whose identity is recognized (e.g. by a facial recognition protocol 105K) and used as a basis for filtering which images 155 are retained in the durable record indicative of the first human response 344.

Clause 63. The method of any of the above Clauses wherein causing a capture 761 of a first human response 344 from the second entity comprises photographing at least one person of the second entity whose gaze upon the AI-based first expression 240 is (automatically or otherwise) discernable in the durable record indicative of the first human response 344 from the second entity.

Clause 64. The method of any of the above Clauses wherein causing a capture 761 of a first human response 344 from the second entity comprises photographing at least one person of the second entity whose gaze upon the AI-based first expression 240 is (automatically or otherwise) discernable in the durable record indicative of the first human response 344 from the second entity.

Clause 65. The method of any of the above Clauses wherein causing a capture 761 of a first human response 344 from the second entity comprises photographing at least one person of the second entity whose gaze upon the AI-based first expression 240 is recognized (e.g. by a facial recognition protocol 105K that uses a crowdsourced prompt 231 like "Does this person appear to be looking at you?") and used as a basis for filtering which images 155 are retained in the durable record indicative of the first human response 344.

Clause 66. The method of any of the above Clauses wherein causing a capture 761 of a first human response 344 from the second entity comprises photographing at least one person of the second entity whose gaze upon the AI-based first expression 240 has a first (apparent or other) duration that can be (estimated or otherwise) characterized in the durable record indicative of the first human response 344 from the second entity.

Clause 67. The method of any of the above Clauses wherein causing a capture 761 of a first human response 344 from the second entity comprises photographing at least one person of the second entity more than 5 times and whose gaze upon the AI-based first expression 240 thereby has a first (apparent or other) duration that can be (estimated or otherwise) characterized in the durable record indicative of the first human response 344 from the second entity.

Clause 68. The method of any of the above Clauses wherein causing a capture 761 of a first human response 344 from the second entity comprises photographing at least one person of the second entity whose gaze direction is (distilled into "left" or "right" or otherwise) discernable in the durable record indicative of the first human response 344 from the second entity.

Clause 69. The method of any of the above Clauses wherein causing a capture 761 of a first human response 344 from the second entity comprises photographing at least one person of the second entity whose gaze direction is recognized (e.g. by a pattern recognition protocol 105K that includes a crowdsourced query) and used as a basis for filtering which images 155 are retained in the durable record indicative of the first human response 344.

Clause 70. The method of any of the above Clauses wherein causing a capture 761 of a first human response 344 from the second entity comprises photographing at least one person of the second entity whose responsive action 233 is recognized (e.g. by a pattern recognition protocol 105K that includes a crowdsourced query) and used so as to provide annotations in or otherwise affect the durable record indicative of the first human response 344.

Clause 71. The method of any of the above Clauses wherein causing a capture 761 of a first human response 344 from the second entity comprises photographing at least one person of the second entity whose responsive action 233 is recognized (e.g. by a pattern recognition protocol 105K that includes a crowdsourced query) and used so as to provide annotations in the durable record indicative of the first human response 344.

Clause 72. The method of any of the above Clauses wherein causing a capture 761 of a first human response 344 from the second entity comprises photographing at least one person of the second entity whose responsive action 233 is recognized (e.g. by a pattern recognition protocol 105K) and used so as to provide one or more annotations in the durable record indicative of the first human response 344 that affect a (speculative or other) messaging effectiveness score 128.

Clause 73. The method of any of the above Clauses wherein causing a capture 761 of a first human response 344 from the second entity comprises photographing at least one person of the second entity whose responsive action 233 is recognized (e.g. by a pattern recognition protocol 105K that includes a crowdsourced query) and used so as to provide one or more annotations in the durable record indicative of the first human response 344 that affect a (speculative or other) messaging effectiveness score 128.

Clause 74. The method of any of the above Clauses wherein causing a capture 761 of a first human response 344 from the second entity comprises photographing at least one person of the second entity whose responsive action 233 is (thus effectively photographed and relevant to and otherwise) suitable for use in generating a messaging effectiveness score 128.

Clause 75. The method of any of the above Clauses wherein causing a capture 761 of a first human response 344 from the second entity comprises photographing at least one person of the second entity whose responsive action 233 is (relevant to and otherwise) used in generating a messaging effectiveness score 128.

Clause 76. The method of any of the above Clauses wherein causing a capture 761 of a first human response 344 from the second entity comprises photographing at least one person of the second entity whose responsive action 233 is quantified (e.g. as a 0 or 1) and used in generating a (speculative or other) messaging effectiveness score 128 that affects the durable record indicative of the first human response 344.

Clause 77. The method of any of the above Clauses wherein causing a capture 761 of a first human response 344 from the second entity comprises photographing at least one person of the second entity whose responsive action 233 is used in generating a (speculative or other) messaging effectiveness score 128 that is recorded in the durable record indicative of the first human response 344.

Clause 78. The method of any of the above Clauses wherein causing a capture 761 of a first human response 344 from the second entity comprises photographing at least one person of the second entity whose responsive action 233 is suitable for use (e.g. as immediately or otherwsise determined by a mechanical Turk or similar crowdsourcing protocol) in generating a messaging effectiveness score 128.

Clause 79. The method of any of the above Clauses wherein causing a capture 761 of a first human response 344 from the second entity comprises photographing at least one person of the second entity whose responsive action 233 is suitable for use in evaluating the AI-based first expression 240 as contemporaneously determined by a crowdsourcing protocol 105F.

Clause 80. The method of any of the above Clauses wherein causing a capture 761 of a first human response 344 from the second entity comprises photographing at least one person of the second entity whose responsive action 233 affects a messaging score 128 in a way that is favorable according to one or more (express or other) preferences 236 of the first entity.

Clause 81. The method of any of the above Clauses wherein causing a capture 761 of a first human response 344 from the second entity comprises photographing at least one person of the second entity whose (company uniform or other detectable) attire affects a messaging score 128 in a way that is favorable according to one or more preferences 236 of the first entity.

Clause 82. The method of any of the above Clauses wherein causing a capture 761 of a first human response 344 from the second entity comprises photographing at least one person of the second entity whose (microexpression or other facially) apparent emotional response 344 affects a messaging score 128 in a way that is favorable according to one or more preferences 236 of the first entity.

Clause 83. The method of any of the above Clauses wherein causing a capture 761 of a first human response 344 from the second entity comprises photographing at least one person of the second entity whose (videotaped gait or other detectable) apparent emotional response 344 affects a message effectiveness score 128 in a way that is favorable according to one or more preferences 236 of the first entity.

Clause 84. The method of any of the above Clauses wherein causing a capture 761 of a first human response 344 from the second entity comprises photographing at least one person of the second entity whose later (direction of travel or other) human response 344 affects a messaging score 128 in a way that is favorable according to one or more (explicit or other) preferences 236 of the first entity.

Clause 85. The method of any of the above Clauses wherein the AI-based first expression 240 is at least partly based on one or more limiting physical features of an LED or other element array 276 aboard the first portable unit 170, 770.

Clause 86. The method of any of the above Clauses wherein the AI-based first expression 240 is at least partly based on one or more limiting physical features of an element array 276 aboard the first portable unit 170, 770 that has more than 50 visual elements and less than 50000 visual elements.

Clause 87. The method of any of the above Clauses wherein the AI-based first expression 240 is at least partly based on one or more limiting physical features of an element array 276 aboard the first portable unit 170, 770 that has more than 500 elements and less than 500000 elements.

Clause 88. The method of any of the above Clauses wherein the AI-based first expression 240 is at least partly based on one or more limiting physical features of a display element array 276 aboard the first portable unit 170, 770; wherein the method comprises:
  causing the AI-based first expression 240 to be suited to and presented on a coarse array 276 (i.e. one having within an order of magnitude of 500 to 50000 elements) aboard the first portable unit 170, 770.

Clause 89. The method of any of the above Clauses wherein the AI-based first expression 240 is at least partly based on one or more limiting physical features of a display element array 276 aboard the first portable unit 170, 770; wherein the method comprises:
  causing the AI-based first expression 240 to be suited to and presented on a coarse array 276 of liquid crystal or light-emitting elements.

Clause 90. The method of any of the above Clauses comprising:
  triggering the first content delivery 740 to the first vicinity 288 via the first portable unit 170, 770 via a camera 172 or microphone 173 aboard the first portable unit 170, 770; and
  later obtaining (at least) a first digital photograph via the first portable unit 170, 770 after the AI-based first expression 240 is presented via the first portable unit 170, 770 whereby the first digital photograph (certainly or otherwise generally) indicates a first human response 344 of the second entity to the AI-based first expression 240.

Clause 91. The method of any of the above Clauses comprising:
  causing a first capture 761 of a first human response 344 without any cooperation or other voluntary participation from the second entity.

Clause 92. The method of any of the above Clauses comprising:
  causing a first capture 761 of a first human response 344 while the second entity is in the first vicinity 288 of the first portable unit 170, 770 while causing the first content delivery 740 to occur in the first vicinity 288 via the first portable unit 170, 770.

Clause 93. The method of any of the above Clauses comprising:
causing a first capture 761 of a first human response 344 by automatically invoking transistor-based circuitry (e.g. an authorization protocol 105E triggering at least a first camera 172 aboard the first portable unit 170, 770) configured to capture a first digital photograph (e.g. as image 155D) via the first portable unit 170, 770.

Clause 94. The method of any of the above Clauses comprising:
presenting the AI-based first expression 240 via the first portable unit 170, 770 whereby the first digital photograph (latently or otherwise) indicates a first human response 344 of the second entity to the AI-based first expression 240.

Clause 95. The method of any of the above Clauses comprising:
capturing one or more human (voluntary or other) responses 344 of the second entity to the AI-based first expression 240 so as to include obtaining a first capture 761 of a first human response 344 by invoking transistor-based circuitry (e.g. an authorization protocol 105E triggering at least a first camera 172 aboard the first portable unit 170, 770).

Clause 96. The method of any of the above Clauses wherein the AI-based first expression 240 is formed partly based on the first message component 237 obtained from the first entity 710 and partly based on one or more attributes 343 of a first vicinity 288 (e.g. a zone type 185 thereof or presence of one or more recognizable targets 189, 789 therein) of the first portable unit 170, 770.

Clause 97. The method of any of the above Clauses comprising invoking transistor-based circuitry configured to cause a contemporaneous or other capture 761 of a second human response 344 via one or more sensors 277 of the first portable unit 170, 770 coordinated with a second content delivery 740 via the first portable unit 170, 770 less than 5 minutes after the first content delivery 740 via the first portable unit 170, 770.

Clause 98. The method of any of the above Clauses comprising:
invoking transistor-based circuitry (e.g. response and retention modules 435, 436 jointly) configured to establish a durable record (explicitly or otherwise) indicative of the first human response 344 from the second entity via the first portable unit 170, 770 corresponding to the first content delivery 740 via the first portable unit 170, 770 wherein some indications in the durable record obtained via the first portable unit 170, 770 are gleaned by crowdsourcing, including one or more indications of the first human response 344 from the second entity.

Clause 99. The method of any of the above Clauses comprising:
invoking transistor-based circuitry (e.g. response and retention modules 435, 436 jointly) configured to establish a durable record (explicitly or otherwise) indicative of the first human response 344 from the second entity via the first portable unit 170, 770 corresponding to the first content delivery 740 via the first portable unit 170, 770 wherein at least some informational content 177 in the durable record (e.g. in one or more repositories 718) is later confirmed by crowdsourcing as indicative of the first human response 344 from the second entity via the first portable unit 170, 770 corresponding to the first content delivery 740 via the first portable unit 170, 770.

Clause 100. The method of any of the above Clauses wherein one or more timestamps 121 are associated with parameters 122 that indicate a timing relationship between the AI-based first expression 240 and the first human response 344 of the second entity.

Clause 101. The method of any of the above Clauses comprising:
invoking transistor-based circuitry (e.g. response and retention modules 435, 436 jointly) configured to establish a durable record (explicitly or otherwise) indicative of the first human response 344 from the second entity via the first portable unit 170, 770 corresponding to the first content delivery 740 via the first portable unit 170, 770 wherein more than 50% of data indicative of the first human response in the durable record are gleaned by crowdsourcing and reside on one or more repositories 718 remote from the first portable unit 170, 770.

Clause 102. The method of any of the above Clauses comprising:
capturing one or more human (voluntary or other) responses 344 of the second entity to the AI-based first expression 240 so as to include obtaining a first capture 761 of a first human response 344 by invoking transistor-based circuitry (e.g. an authorization protocol 105E triggering at least a first camera 172 aboard the first portable unit 170, 770).

Clause 103. The method of any of the above Clauses wherein the AI-based first expression 240 is formed partly based on the first message component 237 obtained from the first entity 710 and partly based on one or more attributes 343 of a first vicinity 288 (e.g. a characterized zone 188, range, or de facto position 788 of one or more targets 189, 789) of the first portable unit 170, 770.

Clause 104. The method of any of the above Clauses wherein the AI-based first expression 240 is adapted partly based on the first message component 237 obtained from the first entity 710 and partly based on one or more visible attributes 343 (e.g. an attire, an apparent age, a gait, a facial expression, or direction of travel) of someone shown in one or more (clip frames or other) photographic images 155D captured from a first vicinity 288 of the first portable unit 170, 770.

Clause 105. The method of any of the above Clauses comprising invoking transistor-based circuitry configured to cause a contemporaneous capture 761 of another human response 344 to the first content delivery 740 via one or more sensors 277 of the first portable unit 170, 770.

Clause 106. The method of any of the above Clauses comprising invoking transistor-based circuitry configured to cause a capture 761 of another human response 344 via one or more sensors 277 of the first portable unit 170, 770 coordinated with a second content delivery 740 via the first portable unit 170, 770 less than 5 minutes after the first content delivery 740 via the first portable unit 170, 770.

Clause 107. The method of any of the above Clauses comprising:
invoking transistor-based circuitry (e.g. response and retention modules 435, 436 jointly) configured to establish a durable record (explicitly or otherwise) indicative of the first human response 344 from the second entity via the first portable unit 170, 770 corresponding to the first content delivery 740 via the first portable unit 170, 770 wherein some indications in the durable record obtained via the first portable unit 170, 770 are gleaned by crowdsourcing, including one or more indications of the first human response 344 from the second entity.

Clause 108. The method of any of the above Clauses comprising:
  invoking transistor-based circuitry (e.g. response and retention modules 435, 436 jointly) configured to establish a durable record (explicitly or otherwise) indicative of the first human response 344 from the second entity via the first portable unit 170, 770 corresponding to the first content delivery 740 via the first portable unit 170, 770 wherein at least some informational content 177 in the durable record (e.g. in one or more repositories 718) is later confirmed by crowdsourcing as indicative of the first human response 344 from the second entity via the first portable unit 170, 770 corresponding to the first content delivery 740 via the first portable unit 170, 770.

Clause 109. The method of any of the above Clauses wherein one or more timestamps 121 are associated with parameters 122 that indicate a timing relationship between the AI-based first expression 240 and the first human response 344 of the second entity.

Clause 110. The method of any of the above Clauses comprising:
  invoking transistor-based circuitry (e.g. response and retention modules 435, 436 jointly) configured to establish a durable record (explicitly or otherwise) indicative of the first human response 344 from the second entity via the first portable unit 170, 770 corresponding to the first content delivery 740 via the first portable unit 170, 770 wherein at least some data indicative of the first human response in the durable record was only latent when first stored and are only later detected and substantively described.

Clause 111. The method of any of the above Clauses wherein some data indicative of the first human response 344 from the second entity via the first portable unit 170, 770 is only latently indicated when first obtained and is detected and marked (e.g. with more than 10 weeks later).

Clause 112. The method of any of the above Clauses wherein hundreds or more items indicative of the first human response 344 (e.g. laughing or smiling) from dozens or more other entities via the first portable unit 170, 770 was only latently indicated when first stored.

Clause 113. The method of any of the above Clauses wherein hundreds or more items of data 294 indicative of a first human response 344 (e.g an emotional or verbal expression) via the first portable unit 170, 770 were latently indicated when first stored and were extracted more than one week later.

Clause 114. The method of any of the above Clauses wherein the durable record is (directly or otherwise) indicative of the first human response 344 to the AI-based first expression 240 from the second entity via the first portable unit 170, 770 is established less than 10 weeks after a capture 761 thereof.

Clause 115. The method of any of the above Clauses wherein the durable record indicative of the first human response 344 from the second entity via the first portable unit 170, 770 is established more than 10 weeks before an extraction of the first human response 344 from the durable record.

Clause 116. The method of any of the above Clauses wherein the first human response 340 (at least apparently) signals that the second entity perceived (at least some of) a visible delivery 740 via the first portable unit 170, 770.

Clause 117. The method of any of the above Clauses comprising:
  automatically invoking transistor-based circuitry configured to capture a second digital photograph via the first portable unit more than one second after the AI-based first expression 240 is presented via the first portable unit whereby the second digital photograph (at least apparently) indicates a second human response 344 of the second entity to the AI-based first expression.

Clause 118. The method of any of the above Clauses comprising:
  automatically invoking transistor-based circuitry configured to capture a second digital photograph via the first portable unit more than one second after the AI-based first expression 240 is presented via the first portable unit whereby the second digital photograph (at least apparently) indicates a second human response of the second entity to the AI-based first expression wherein a second human response 344 (at least apparently) signaled that the second entity (acquiesced to, followed, smiled at, complied with, favored, or otherwise actively) accepted the first message component via the first portable unit.

Clause 119. The method of any of the above Clauses comprising:
  automatically invoking transistor-based circuitry configured to capture a second digital photograph via the first portable unit more than one second after the AI-based first expression 240 is presented via the first portable unit whereby the second digital photograph indicates a second human response of the second entity to the AI-based first expression wherein a second human response 344 signaled that the second entity (acted indifferent about or otherwise apparently) did not reject the first message component via the first portable unit.

Clause 120. The method of any of the above Clauses wherein one or more timestamps 121 indicate a timing relationship between the AI-based first expression 240 and the first human response 344 from the second entity.

Clause 121. The method of any of the above Clauses wherein a second human response 344 (at least apparently) signaled that the second entity (acquiesced to or otherwise at least apparently) did not reject the first message component via the first portable unit.

Clause 122. The method of any of the above Clauses wherein a second human response 344 (at least speculatively) signaled that the second entity (did not reject or otherwise at least apparently) accepted the first message component via the first portable unit.

Clause 123. The method of any of the above Clauses comprising:
  applying at least one scoring function 292 to a first set of expressions that include the AI-based first expression whereby a resulting score 128 as described herein correlates (with a correlation coefficient having a magnitude greater than 0.6) with temporal associations at least between a first or second human response 344 and the AI-based first expression 240 to which it applies.

Clause 124. A context-responsive system for artificial-intelligence-based (AI-based) messaging via a first portable unit 170, 770; the system comprising:
  transistor-based circuitry (e.g. a second invocation module 433) configured to cause an AI-based first expression 240 to be formed (remotely or otherwise) based on a first message component 237 obtained from a human cohort or other "first" entity 710; and
  transistor-based circuitry (e.g. one or more control modules 432) configured to cause a first content delivery 740 of the AI-based first expression 240 to a second entity in a first sight line 339 or other vicinity 288 of said first portable unit 170, 770 (e.g. to an unknown set of occupants or single identified target 789 therein).

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Terms like "responsive to," "related to," or other such transitive, relational, or other connections do not generally exclude such variants, unless context dictates otherwise. Furthermore each claim below is intended to be given its least-restrictive interpretation that is reasonable to one skilled in the art.

What is claimed is:

1. A context-responsive method for artificial-intelligence-based (AI-based) messaging via a first portable unit, said method comprising:
    causing, by one or more processors, an AI-based first expression to be formed based on a first message component obtained from a first entity wherein said causing said AI-based first expression to be formed includes remotely or otherwise forming said AI-based first expression partly based on said first message component obtained from said first entity and partly based on one or more limiting physical features of an element array, said element array comprising said first display aboard said first portable unit;
    causing, by said one or more processors, a first content delivery of said AI-based first expression to a second entity in a first vicinity of said first portable unit via said first portable unit wherein said causing said first content delivery of said AI-based first expression to said second entity in said first vicinity via said first portable unit includes causing one or more images of said AI-based first expression to be presented on said first display while said first display is moving away from said second entity and also causing a capture of a first digital photograph that indicates a first human response of said second entity in said first vicinity of said first portable unit via said first portable unit coordinated with said first content delivery of said AI-based first expression whereby said first digital photograph indicates said first human response of said second entity to said AI-based first expression; and
    causing, by said one or more processors, an establishment of a durable record indicative of said first human response from said second entity corresponding to said first content delivery of said AI-based first expression via said first portable unit.

2. The method of claim 1 comprising:
    immediately triggering said capture of said first human response from said second entity in said first vicinity of said first portable unit via said first portable unit during or within one second after said first content delivery to said first vicinity via said first portable unit.

3. The method of claim 1 comprising:
    causing said capture response to said first content delivery to said first vicinity via said first portable unit.

4. The method of claim 1 wherein said causing said capture of said first human response from said second entity comprises photographing at least one person of said second entity whose responsive action affects a first merit-indicative score that is used as training data in one or more machine learning adjustment iterations whereby one or more future expressions become progressively more effective.

5. The method of claim 1 comprising:
    causing a capture of a second human response via one or more sensors of said first portable unit coordinated with a second content delivery via said first portable unit more than one second and less than 5 minutes after said first content delivery via said first portable unit.

6. The method of claim 1 comprising:
    establishing said durable record indicative of said first human response from said second entity via said first portable unit corresponding to said first content delivery via said first portable unit wherein at least some informational content in said durable record is later confirmed by crowdsourcing as indicative of said first human response from said second entity via said first portable unit corresponding to said first content delivery via said first portable unit.

7. The method of claim 1 wherein one or more timestamps are associated with parameters that indicate a timing relationship between said AI-based first expression and said first human response of said second entity and wherein some data indicative of said first human response from said second entity via said first portable unit is latently indicated when first obtained and is marked more than 10 weeks later.

8. The method of claim 1 wherein said first human response signaled that said second entity perceived a visible delivery via said first portable unit and wherein a second human response signaled that said second entity did not reject said first message component via said first portable unit.

9. The method of claim 1 wherein said AI-based first expression is at least partly based on one or more limiting physical features of a coarse element array aboard said first portable unit, said method comprising:
    causing said AI-based first expression to be presented on said coarse element array aboard said first portable unit.

10. The method of claim 1 wherein causing said capture of said first human response from said second entity comprises photographing at least one person of said second entity whose responsive action is used in generating a messaging effectiveness score.

11. The method of claim 1 comprising:
    causing said capture of said first human response from said second entity comprises photographing at least one person of said second entity whose responsive action is recognized and used so as to provide annotations in or otherwise affect said durable record indicative of said first human response from said second entity via said first portable unit corresponding to said first content delivery via said first portable unit.

12. The method of claim 1 wherein said causing said first content delivery of said AI-based first expression to said second entity in said first vicinity via said first portable unit includes causing a capture of a first digital photograph that indicates said first human response of said second entity in said first vicinity of said first portable unit via said first portable unit coordinated with said first content delivery of said AI-based first expression whereby said first digital photograph indicates said first human response of said second entity to said AI-based first expression.

13. The method of claim 1
    whereby said first digital photograph indicates said first human response of said second entity to said AI-based first expression less than one second after said AI-based first expression is presented via said first portable unit.

14. The method of claim 1 wherein
wherein at least some data indicative of said first human response in said durable record is augmented with substantive description more than 10 weeks later.

15. The method of claim 1
wherein one or more timestamps indicate a timing relationship between a beginning of said first content delivery and said first human response from said second entity.

16. The method of claim 1 wherein said first capture of said first human response is automatically coordinated with said first content delivery insofar that said first capture of said first human response and said first content delivery are both triggered by a single common triggering event at said first portable unit.

17. The method of claim 1 comprising:
causing said capture of said first human response from said second entity comprises photographing at least one person of said second entity whose responsive action is recognized and used.

18. A context-responsive computer program product for artificial-intelligence-based (AI-based) messaging via a first portable unit, said context-responsive computer program product comprising:
one or more tangible, non-transitory storage media; and
machine instructions borne on said one or more tangible, non-transitory storage media which, when running on one or more computer systems, cause said one or more computer systems to perform a method comprising:
causing an AI-based first expression to be formed based on a first message component obtained from a first entity wherein said causing said AI-based first expression to be formed includes remotely or otherwise forming said AI-based first expression partly based on said first message component obtained from said first entity and partly based on one or more limiting physical features of an element array, said element array comprising said first display aboard said first portable unit;
causing a first content delivery of said AI-based first expression to a second entity in a first vicinity of said first portable unit via said first portable unit wherein said causing said first content delivery of said AI-based first expression to said second entity in said first vicinity via said first portable unit includes causing one or more images of said AI-based first expression to be presented on said first display while said first display is moving away from said second entity and also causing a capture of a first digital photograph that indicates a first human response of said second entity in said first vicinity of said first portable unit via said first portable unit coordinated with said first content delivery of said AI-based first expression whereby said first digital photograph indicates said first human response of said second entity to said AI-based first expression; and
causing an establishment of a durable record indicative of said first human response from said second entity corresponding to said first content delivery of said AI-based first expression via said first portable unit.

* * * * *